United States Patent
Halliar

(10) Patent No.: US 8,540,466 B2
(45) Date of Patent: Sep. 24, 2013

(54) ADJUSTABLE BULKHEAD FOR A RAILCAR

(75) Inventor: William R. Halliar, Whiting, IN (US)

(73) Assignee: TTX Company, Chicago, IL (US)

( * ) Notice: Subject to any disclaimer, the term of this patent is extended or adjusted under 35 U.S.C. 154(b) by 545 days.

(21) Appl. No.: 11/796,099

(22) Filed: Apr. 26, 2007

(65) Prior Publication Data

US 2008/0166199 A1 Jul. 10, 2008

Related U.S. Application Data

(60) Provisional application No. 60/795,973, filed on Apr. 28, 2006.

(51) Int. Cl.
*B60P 7/08* (2006.01)

(52) U.S. Cl.
USPC .............................. 410/94; 410/121

(58) Field of Classification Search
USPC ............ 410/47, 49, 50, 91, 94, 95, 121, 129, 410/143, 144, 150, 153; 224/42.33; 105/355, 105/374; 248/351
See application file for complete search history.

(56) References Cited

U.S. PATENT DOCUMENTS

| | | | |
|---|---|---|---|
| 1,401,419 A | 12/1921 | McNally | |
| 2,819,688 A * | 1/1958 | Hall | |
| 3,089,437 A | 5/1963 | Hendricker | |
| 3,464,368 A | 9/1969 | Cordani | |
| 3,779,174 A | 12/1973 | Doyle et al. | |
| 4,091,742 A | 5/1978 | Cordani | |
| 4,193,736 A | 3/1980 | Thomaswick | |
| 4,498,824 A | 2/1985 | Kinkle | |
| 4,648,764 A | 3/1987 | Pavlick | |
| 4,799,840 A | 1/1989 | Van Gompel et al. | |
| 5,076,745 A | 12/1991 | Klein | |
| 5,137,405 A * | 8/1992 | Klein | 410/94 |
| 5,378,047 A | 1/1995 | Merrett et al. | |
| 6,099,220 A | 8/2000 | Poth | |
| 6,431,804 B1 * | 8/2002 | Wetzig, III | 410/94 |
| 6,572,314 B2 | 6/2003 | French | |
| 2008/0011187 A1 | 1/2008 | Halliar et al. | |
| 2008/0166199 A1 | 7/2008 | Halliar | |

* cited by examiner

*Primary Examiner* — Stephen Gordon
(74) *Attorney, Agent, or Firm* — Brinks Hofer Gilson & Lione

(57) ABSTRACT

An adjustable bulkhead for a railcar is provided. The adjustable bulkhead is releasably attachable to the railcar. The adjustable bulkhead is adjustable between a plurality of positions along the length of the railcar relative to the end of the railcar. The adjustable bulkhead includes a support structure, a reinforcement mechanism, and a stabilizing mechanism.

8 Claims, 14 Drawing Sheets

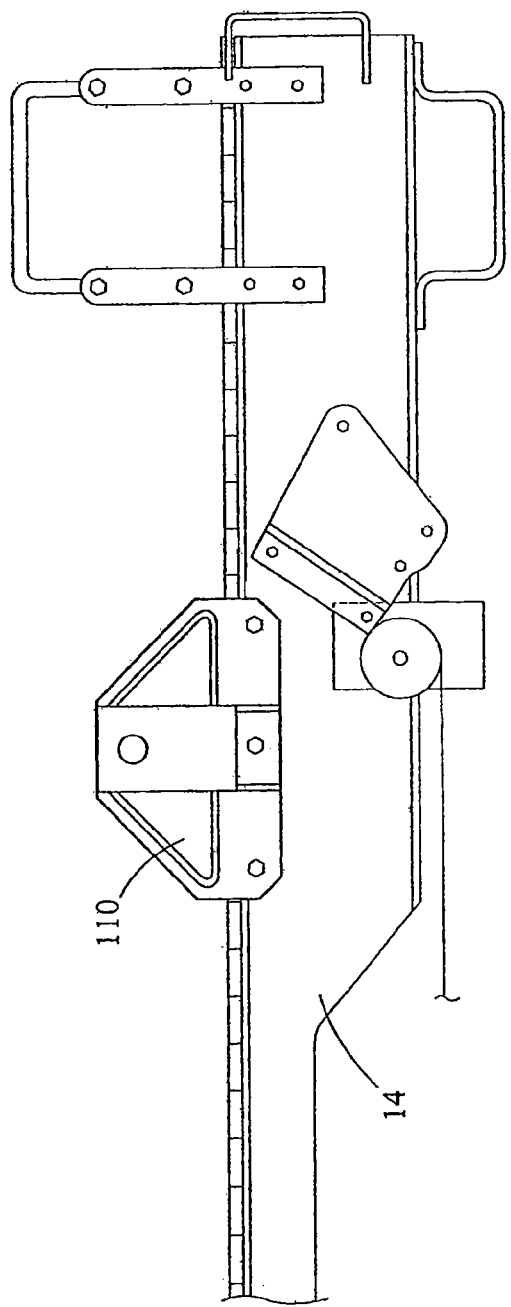
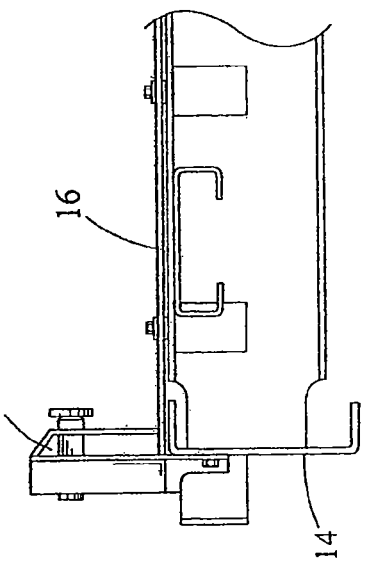
Fig. 11A
Fig. 11B

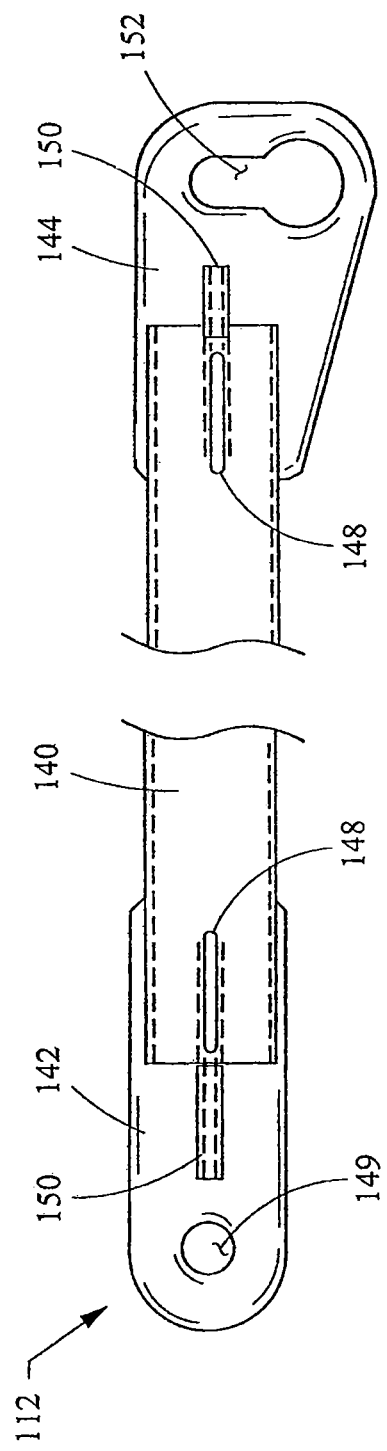
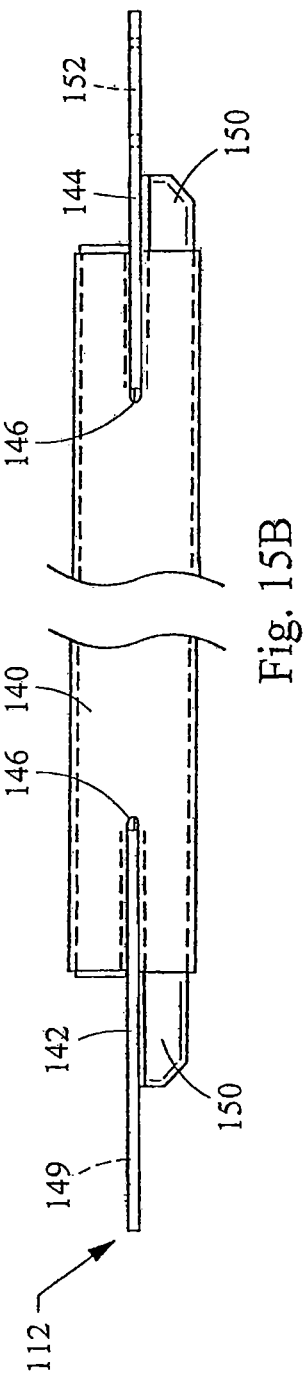
Fig. 15A
Fig. 15B

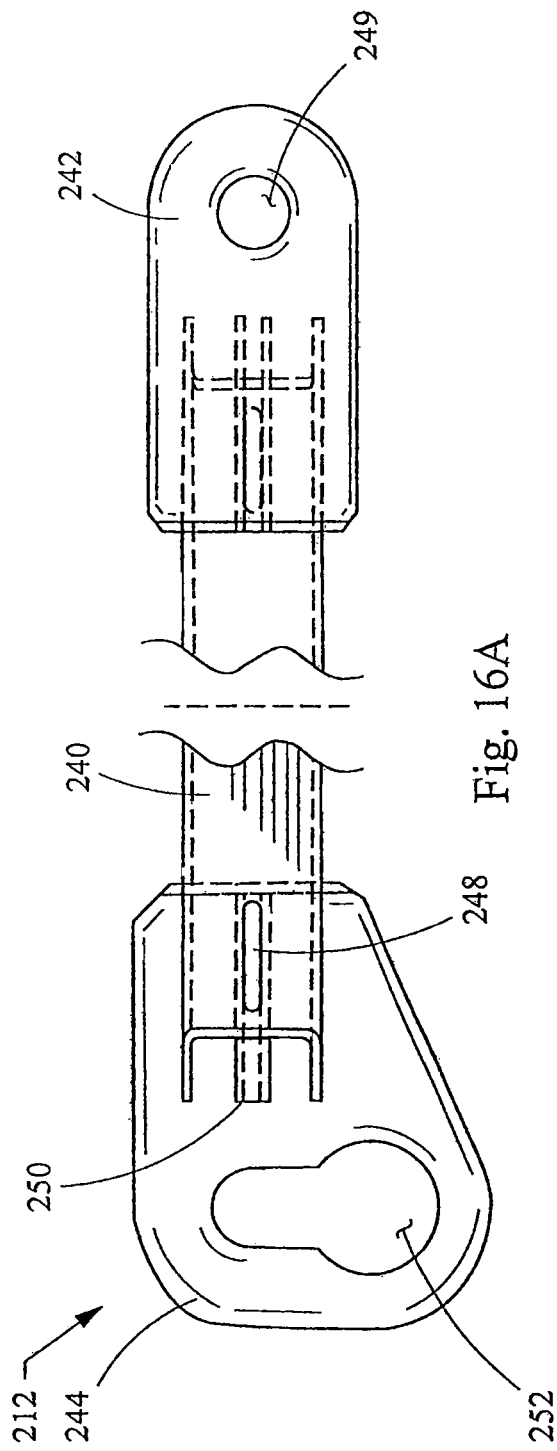
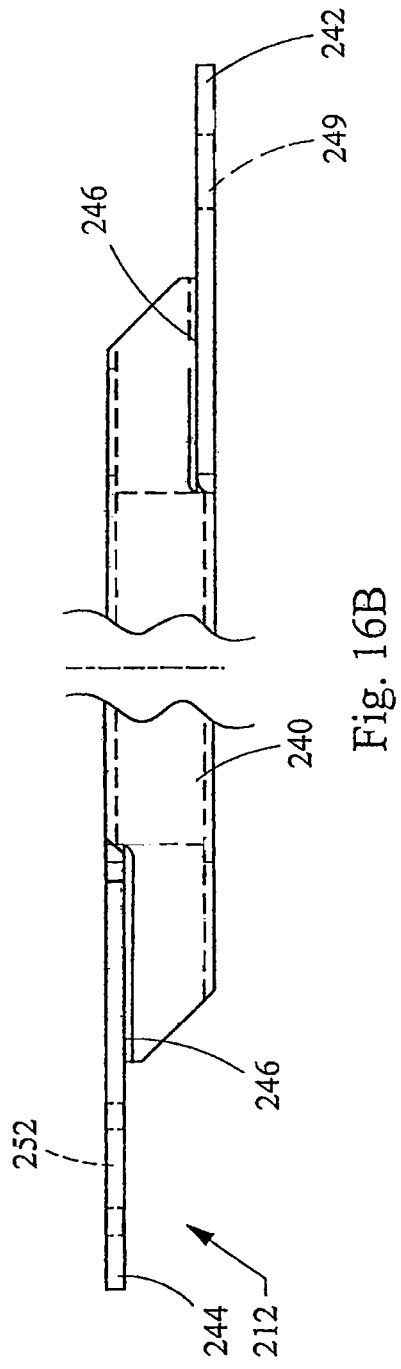
Fig. 16A
Fig. 16B

ADJUSTABLE BULKHEAD FOR A RAILCAR

RELATED APPLICATIONS

This application claims the benefit under 35 U.S.C. §119 (e) of U.S. Provisional Application No. 60/795,973, filed Apr. 28, 2006, and titled "Adjustable Bulkhead for a Railcar," which is incorporated herein by specific reference.

FIELD OF THE INVENTION

This invention relates to bulkheads on railcars, and more particularly to an adjustable bulkhead for a railcar.

BACKGROUND

Bulkheads for use on railcars, and more particularly flatcars, are generally known by those skilled in the art. Bulkheads are typically attached to railcars when transporting floating loads. Floating loads are generally not restrained in the longitudinal direction, relative to the railcar and rails, by a stop. According to top-loading rules relating to railcars set forth by the American Association of Railroads, a bulkhead is required when transporting a floating load. The bulkhead acts to maintain the floating load in a secured manner in case the load slides during impact of the railcar or shifting of the load in the longitudinal direction relative to the railcar during transport. Various types and sizes of loads are transported by railcar, but conventional bulkhead railcars have a bulkhead disposed at opposing distal ends of the railcar relative to the length of the railcar.

Bulkheads are typically attached to a railcar by securing a large member that extends upwardly from the railcar floor in a cantilevered manner. The bulkhead is typically attached to the railcar by nuts-and-bolts, welding, any combination thereof, or any other attachment mechanism known to those skilled in the art. Bulkheads are generally attached to railcars in a substantially fixed, or permanently-attached, manner. However, when transporting loads other than floating loads in which a bulkhead is not necessary, the bulkhead may burdensome to the loading and unloading of the railcar. Further, for loads of different lengths relative to the length of the railcar, a permanently-attached bulkhead does not provide for fore-aft support of the load unless the load slides a substantial distance, whereby the force of impact between the load and the bulkhead may increase due to the momentum that the load may accumulate. The presence of bulkheads on load configurations that do not require bulkheads unnaturally limits the loading capacity of the railcar. The weight of the unnecessary bulkhead displaces usable load for transport. Removal of the bulkhead from railcars is very labor-intensive, costly, and may require structural changes to the railcar itself.

BRIEF SUMMARY

According to a first aspect of the present invention, an adjustable bulkhead is provided. The railcar to which the adjustable bulkhead is attached includes a deck and a side sill. The adjustable bulkhead includes a support structure operatively attachable to the railcar. The support structure is removably attachable at a plurality of positions along the deck of the railcar.

According to another aspect of the present invention, a method for attaching an adjustable bulkhead to a railcar is provided. The method includes providing a support structure that is releasably connectable to the railcar. The method further includes attaching the support structure to the railcar, wherein the support structure is adjustable between a plurality of positions on the railcar relative to an end of the railcar.

Advantages of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are to be regarded as illustrative in nature and not as restrictive.

BRIEF DESCRIPTION OF THE DRAWINGS

FIGS. 11A and 11B are side views of a stabilizing bracket attached to a railcar;

FIG. 15A is a side view of one embodiment of a side brace;

FIG. 15B is a top view of the side brace of FIG. 15A;

FIG. 16A is a side view of an alternative embodiment of a side brace;

FIG. 16B is a top view of the side brace of 16A.

DETAILED DESCRIPTION OF THE DRAWINGS AND THE PRESENTLY PREFERRED EMBODIMENTS

Figure 1:
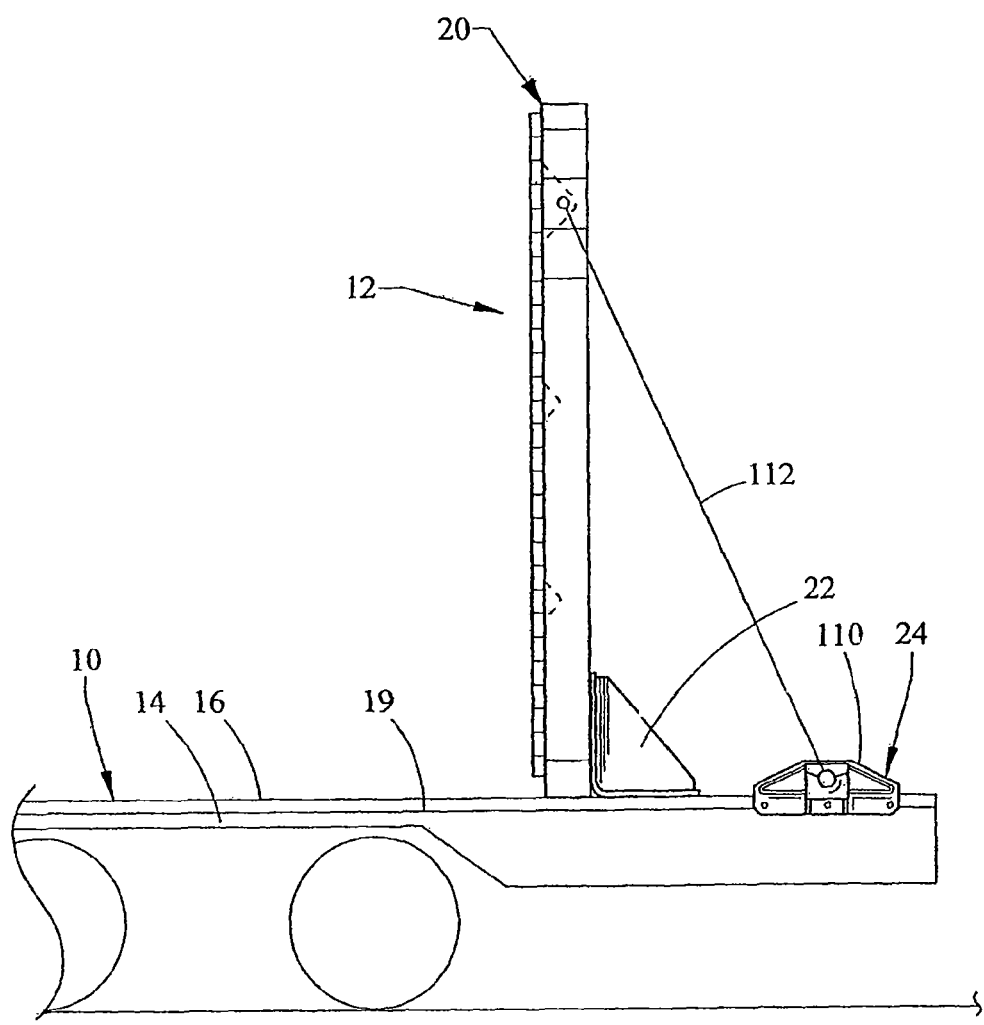
FIG. 1 is a side view of one embodiment of an adjustable bulkhead attached to a railcar.
Figure 2:
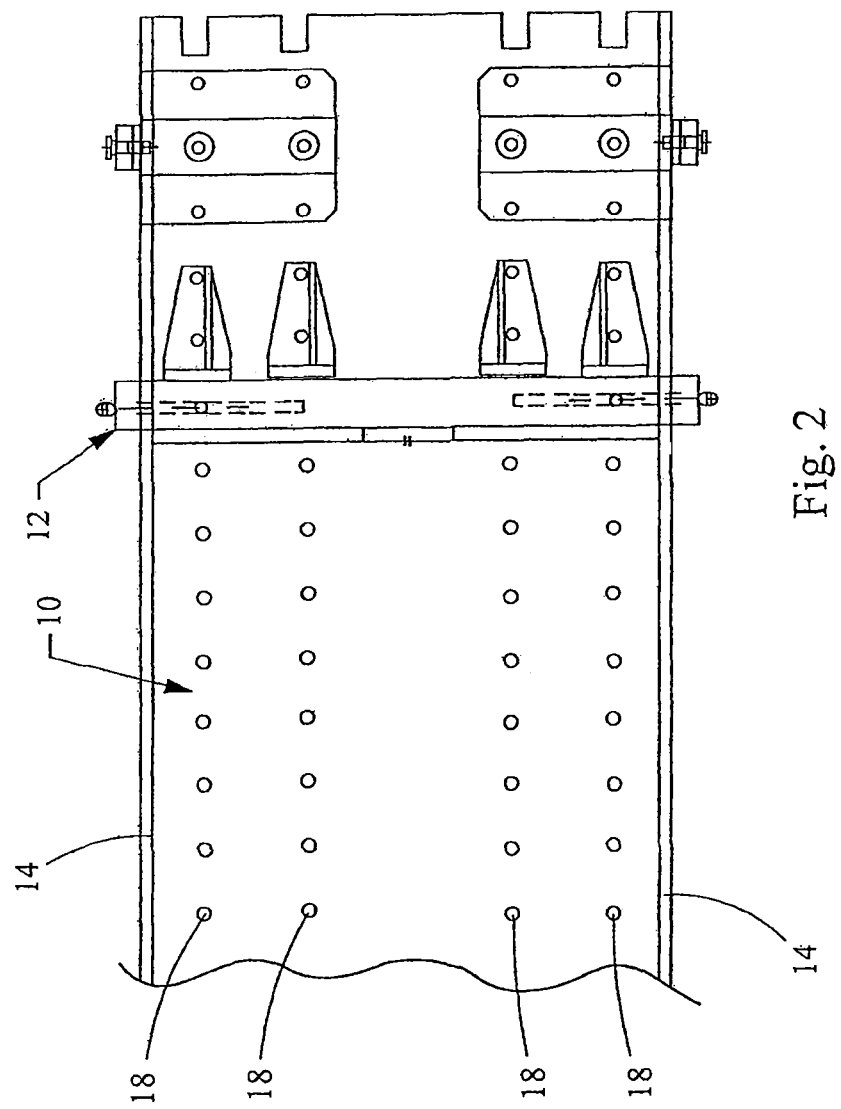
FIG. 2 is a top view of the adjustable bulkhead of FIG. 1 attached to a railcar.

Referring to FIGS. 1-2, one embodiment of a railcar 10 and an adjustable bulkhead 12 are shown. The railcar 10 is illustrated as a conventional flat-deck railcar having a pair of substantially parallel, spaced-apart side sills 14, an end sill (not shown) extending between the ends of the side sills 14, and a deck 16. The deck 16 of the railcar 10 is shown as a substantially flat one-piece surface having a plurality of spaced-apart apertures 18 formed therethrough. A plurality of apertures 18 formed through the deck 16 are aligned in a direction transverse to the length of the railcar 10 as well as in a direction substantially parallel to the length of the railcar 10, thereby forming a pattern of spaced-apart apertures 18. Each side sill 14 also includes a plurality of apertures 19 formed therethrough in a substantially linear direction along the length of the side sill 14. Each of the apertures 19 formed through the side sill 14 are aligned with a row or apertures 18 formed through the deck 16.

Bulkheads are generally attached to a flatbed railcars 10 to provide an apparatus for preventing loads from sliding or falling off the ends of the railcar due to the shifting of the load during transport, particularly in the longitudinal direction that is substantially parallel to the side sills of the railcar as well as the rails of the track on which the railcar is disposed. Because of the forces exerted on the loads in the longitudinal direction during acceleration or deceleration of the railcar, particularly rapid accelerations caused by an impact, a bulkhead must be designed with stand the impact or the force applied to the bulkhead by the load thereto if the load shifts during transport. Typically, one bulkhead is attached to each end of the railcar so as to interrupt the movement of the shifting load at both ends of the railcar, thereby preventing the load from shifting in either the fore and aft directions beyond the ends of the railcar.

Figure 3:
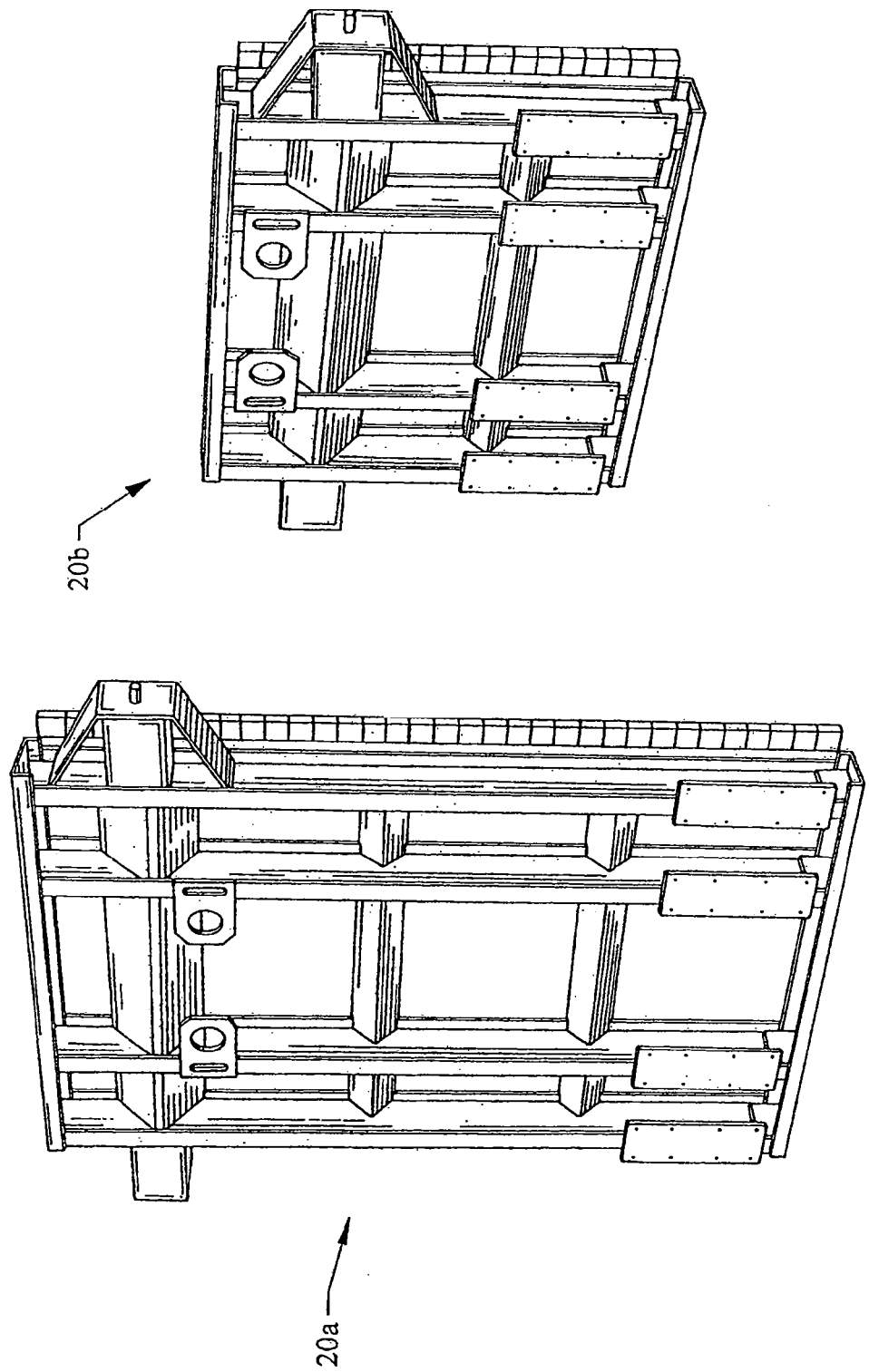
FIG. 3 is two embodiments of a support structure of an adjustable bulkhead.

One embodiment of an adjustable bulkhead 12, as shown in FIGS. 1-2, includes a support structure 20, a reinforcement mechanism 22, and a stabilizing mechanism 24. As shown in FIG. 3, two embodiments of a support structure 20a, 20b of an adjustable bulkhead 12 are shown. While the overall structure of each of these two embodiments is substantially similar, the height of the support structure 20a, 20b is different. Railcars 10 are used to transport various types of loads, and different sizes and heights of bulkheads can be used when transporting various types of loads. For example, when transporting coiled rods of steel the height of the bulkhead does not have to be as high as when a load of sheet rock or logs is being transported. The description below provides the structural elements of both embodiments of the support structure 20a, 20b in reference to an exemplary embodiment of a support structure 20 for an adjustable bulkhead 12. One skilled in the art would understand the different sizes and shapes of the structural members as they are used on various embodiments of an adjustable bulkhead.

The support structure 20 of an adjustable bulkhead 12 is shown in FIGS. 1-2 in an attached, secured position relative to a railcar 10. The adjustable bulkhead 12 is removable from the railcar 10 as well as adjustable between a plurality of positions along the length of the railcar 10 relative to the end of the railcar 10 in order to allow the railcar 10 to be a more universal railcar that can be used in a variety of different operations and capable of carrying a variety of different loads. For example, a bulkhead that is permanently, or semi-permanently, attached to the railcar does not allow for the transport of some loads such as pipes or tubes that are longer than the length of the deck 16. A permanently attached bulkhead may also interfere with the loading or unloading of various loads, whereas the adjustable bulkhead 12 is capable of being removed, thereby allowing the modification of the railcar 10 for use in more applications than a railcar having a permanently attached bulkhead. Further, for loads having a length substantially shorter than the length of the deck 16, the adjustable bulkhead 12 is adjustable along the length of the railcar 10 in order to reduce the gap between the adjustable bulkhead 12 and the load so as to ensure that the load does not slide off the railcar 10.

Figure 4:
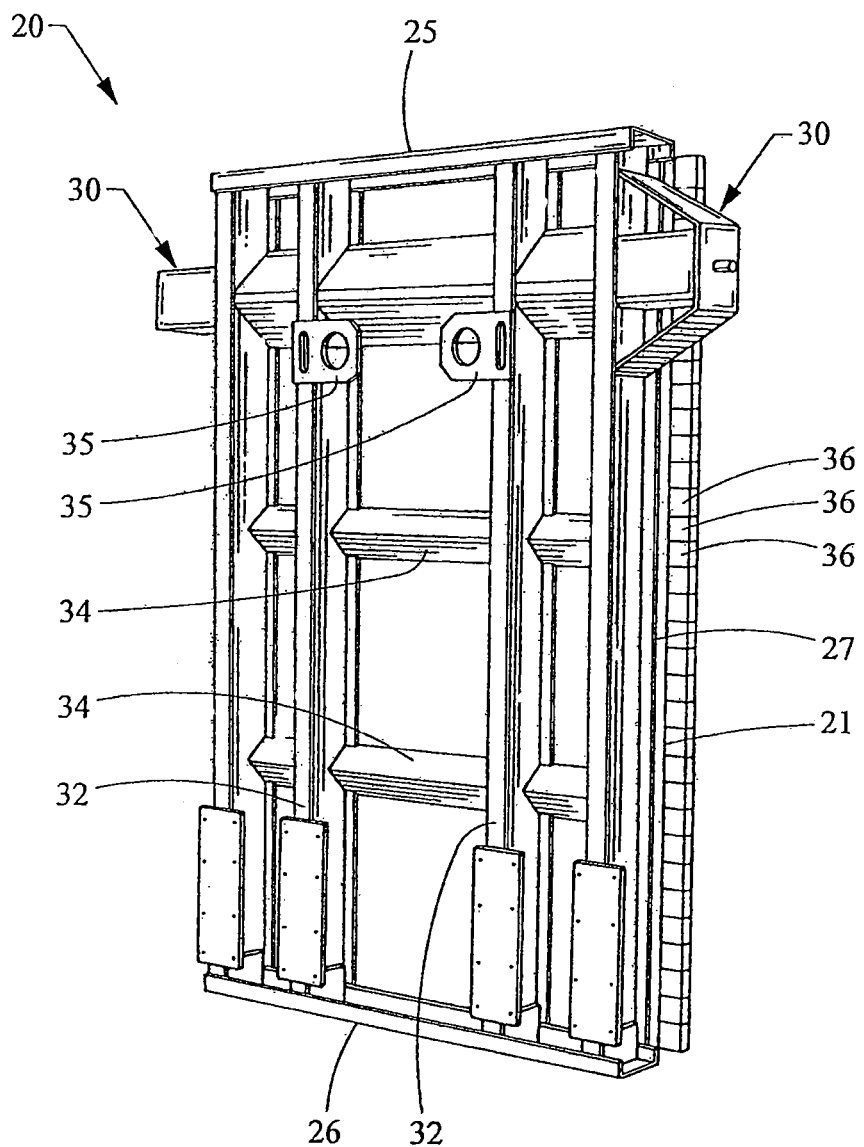
FIG. 4 is an exemplary embodiment of a support structure of an adjustable bulkhead.

As shown in FIGS. 1-2, an adjustable bulkhead 12 includes a support structure 20, a reinforcement mechanism 22, and a stabilizing mechanism 24. FIG. 4 illustrates an exemplary embodiment of a support structure 20, wherein the support structure 20 of an adjustable bulkhead 12 includes a stop surface 21, a top chord 25, a bottom chord 26, a face plate 27, a side connecting mechanism 30 extending laterally from the support structure 20, at least two vertical braces 32, at least one horizontal brace 34, and a pair of lifting lugs 35. When the adjustable bulkhead 12 is attached to a railcar 10, the support structure 20 is oriented such that the stop surface 21 is directed toward the loading area of deck 16 of the railcar 10. The stop surface 21 is adapted to receive or contact the load being carried by the railcar 10 if the load were to shift during transport. In one embodiment, the stop surface 21 is formed of a plurality of planks 36 oriented in a substantially parallel, abutting relationship relative to an adjacent plank 36. The planks 36 are aligned such that the longitudinal length of each plank 36 is oriented in a transverse manner relative to the side sills 14 of the railcar 10. The planks 36 are preferably made of wood. The stop surface 21 may also be formed of sheet aluminum, sheet steel, or any other material sufficient to absorb the impact or forces exerted thereupon by the load being transported if the load shifts. Additionally, the stop surface 21 can be formed as a single member or a plurality of members aligned in an abutting or a spaced-apart manner. The stop surface 21 is attached to the support structure 20 by a plurality of bolts, but the stop surface 21 may also be attached to the support structure 20 by welding, rivets or any other attachment mechanism sufficient to secure the stop surface 21 to the support structure 20. The stop surface 21 may be directly attached to the support structure 20, or an intermediate or buffer member may be disposed between the stop surface 21 and the support structure 20.

The top chord 25 of the support structure 20, as illustrated in FIG. 4, is formed as a generally U-shaped member in which the flanges 28 of the top chord 25 are directed downwardly toward the bottom chord 26. The longitudinal length of the top chord 25 is oriented in a substantially horizontal manner. The top chord 25 is formed of steel, but can be made of any material sufficient to reinforce the stop surface 21.

The bottom chord 26 of the support structure 20, as illustrated in FIG. 4, is formed as a generally U-shaped member in which the flanges of the bottom chord 26 are directed downwardly toward the top chord 25 in an opposing manner. The longitudinal length of the bottom chord 26 is oriented in a substantially horizontal manner. The bottom chord 26 is formed of steel, but can be made of any material sufficient to reinforce the stop surface 21.

The face plate 27 is a vertically oriented piece of sheet material that is disposed between the stop surface 21 and the vertical braces 32, as illustrated in FIG. 4. The face plate 27 extends between, and is attached to, both the top and bottom chords 25, 26. The face plate 27 is also attached to the stop surface 21, thereby providing support thereto. The face plate 27 is a structural member that may provide a buffer between the stop surface 21 and the vertical and horizontal braces 32, 34 of the support structure 20. The face plate 27 is formed of sheet steel, but can be made of any other material sufficient to withstand the forces exerted upon the adjustable bulkhead 12 by a load shifting during transport.

Figure 5A:
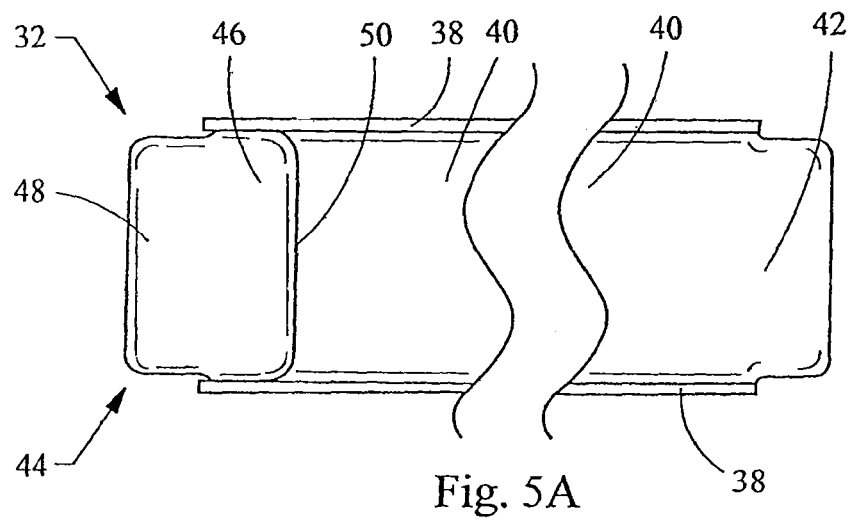
FIG. 5A is a side view of a vertical brace.
Figure 5B:
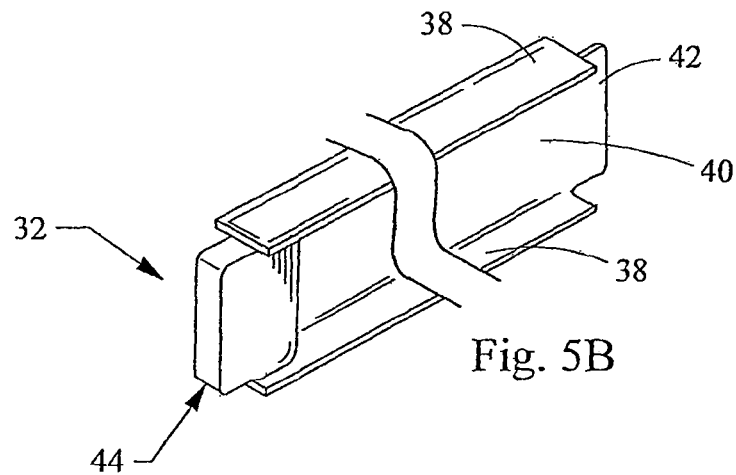
FIG. 5B is a perspective view of the vertical brace of FIG. 5A.

As shown in FIG. 4, four spaced-apart vertical braces 32 extend between the top chord 25 and bottom chord 26, but any number of vertical braces 32 can be used for the support structure 20. Each vertical brace 32 is formed of an I-beam having a pair of substantially parallel, spaced-apart flanges 38 connected by a web 40, as shown in FIGS. 5A-5B. At one distal end of each vertical brace 32, the web 40 extends beyond the flanges 38 to form an extension portion 42. The extension portion 42 is adapted to be received within the U-shaped portion of the top chord 25, and the shape and size of the extension portion 42 is configured to fit within the top chord 25 such that the surfaces of the extension portion 42 are in an abutting relationship with the inner surface of the top chord 25. Each vertical brace 32 is attached to the top chord 25 by welding, but any other attachment mechanism between each vertical brace 32 and the top chord 25 sufficient to withstand the forces exerted upon the adjustable bulkhead 12 can be used. The vertical brace 32 is oriented such that an outer surface of one flange 38 is in a substantially parallel, abutting relationship with the face plate 27. Each vertical brace 32 is attached to the surface of the face plate 27 opposite the surface to which the stop surface 21 is attached.

Each vertical brace 32 includes a connecting pin 44 attached thereto, as illustrated in FIGS. 4 and 5A-5B. In one embodiment, the connecting pin 44 includes a base 46 and an elongated portion 48 extending therefrom. The base 46 is formed as a substantially rectangular portion having a top surface 50. The elongated portion 48 extends from the base 46 in the direction opposite the top surface 50. In one embodiment, the base 46 and the elongated portion 48 are formed as a single member. In an alternative embodiment, the base 46 and elongated portion 48 are formed as separate members that are fixedly connected to each other.

The portion of the web 40 of the vertical brace 32 opposite the extension portion 48 is cut out in a shape substantially similar to the top surface 50 of the connecting pin 44. The connecting pin 44 is disposed within the cut out portion of the web 40 of the vertical brace 32 in an abutting manner such that the top surface 50 contacts the web 40 and the opposing flanges 38 of the vertical brace 32. The connecting pin 44 may be welded to the vertical brace 32, or any other attachment means sufficient to withstand the loads applied to the adjustable bulkhead 12 can be used. The vertical brace 32 is attached to the bottom chord 26 such that the opposing flanges 38 of the vertical brace 32 are disposed adjacent to opposing flanges of the bottom chord 32 and the elongated portion 48 is disposed adjacent to the inner surface of the opposing flanges as well as the web of the bottom chord 26. The vertical brace 32 may be attached to the bottom chord 26 by way of a weld so as to provide a secure connection between the vertical brace 32 and the bottom chord 26.

Figure 6:
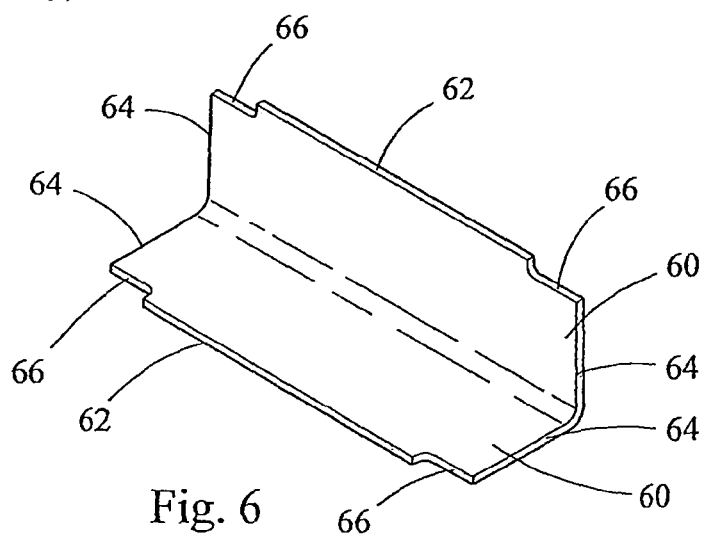
FIG. 6 is a perspective view of a horizontal brace.

As shown in FIG. 4, a plurality of horizontal braces 34 are disposed between each of the vertical braces 32, wherein the plurality of horizontal braces 34 are aligned to form a single member extending between the outwardmost vertical braces 32. Each horizontal brace 34 is an elongated member having a pair of legs 60, wherein each leg is formed at an angle relative to the other leg, as shown in FIG. 6. In one embodiment, the horizontal brace 34 is formed from a stamped piece of metal, wherein a radius of curvature is formed between the pair of legs 60. In an alternative embodiment, the horizontal brace 34 is formed by two elongated pieces of metal attached to each other by a weld or other attachment mechanism. While the horizontal brace 34 is shown as being a two-legged angled member, the horizontal brace 34 may also have a square cross-section, rectangular cross-section, or any other cross-section sufficient to provide support to the stop surface 21 and between the vertical braces 32. The longitudinal edges 62 of each leg 60 are disposed in an abutting relationship with the face plate 27, and the end edges 64 of each leg 60 are disposed in an abutting relationship with the web 40 of the vertical braces 32 between which each horizontal brace 34 extends. Each longitudinal edge 62 includes a cut-out 66 at each end thereof. The cut-outs 66 allows the end edges 64 to contact the web 40 of a vertical brace 32 and each cut-out 66 is adapted to receive a flange 38 of the vertical brace 32. Each horizontal brace 34 can be attached to the face plate 27 and adjacent vertical braces 32 by welding, but any other attachment means sufficient to secure the horizontal brace to the face plate and vertical braces can be used. The number of horizontal members formed by the alignment of a plurality of horizontal braces 34 can vary, but the support structure 20 should include at least one horizontal load path formed by horizontal braces 34, wherein the horizontal braces 34 may extend between the pair of side connecting mechanisms 30.

As shown in FIG. 4, three horizontal braces 34 are aligned along their longitudinal axis between each of the four single-piece vertical braces 32. In an alternative embodiment (not shown), each horizontal brace 34 is formed as single-piece members and vertical braces 32 are disposed between adjacent horizontal braces 34.

Figure 7:
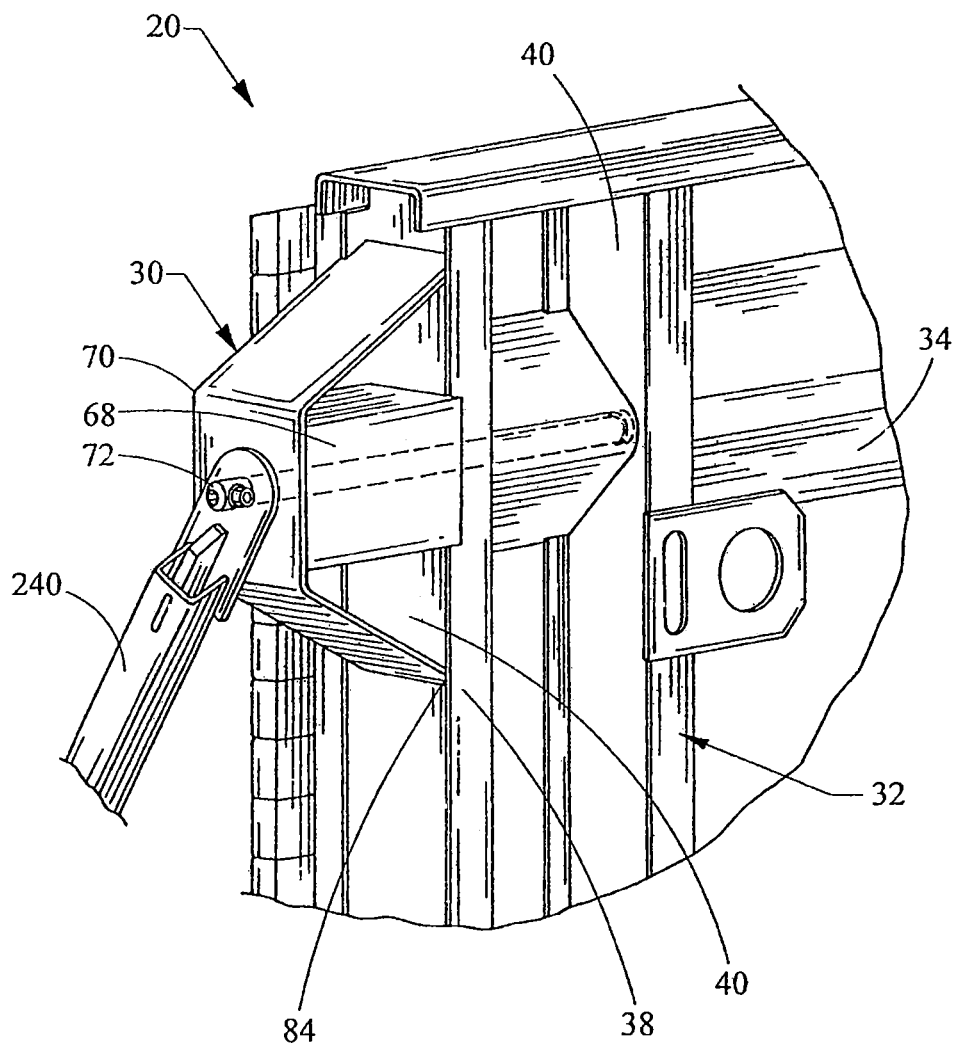
FIG. 7 is a magnified view of a side connecting mechanism extending from a support structure of an adjustable bulkhead.
Figure 8:
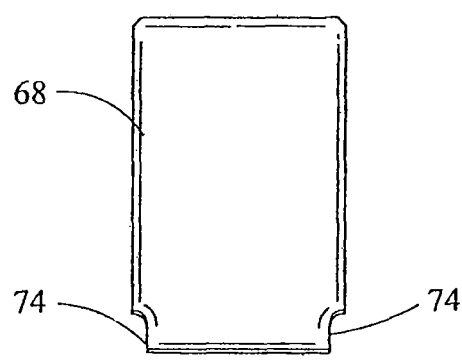
FIG. 8 is a side view of a reinforcement tube of the side connecting mechanism of FIG. 7.

A side connecting mechanism 30 extends laterally outward from both sides the support structure 20 in opposing directions, as illustrated in FIGS. 4 and 7. Each side connecting mechanism 30 is operatively connected to a vertical brace 32, and each side connecting mechanism 30 is preferably disposed adjacent to the upper portion of the vertical brace 32. Each side connecting mechanism 30 includes a reinforcement tube 68, a reinforcement plate 70, and a collar pin 72 that extends through the reinforcement tube 68 and the reinforcement plate 70, as shown in FIG. 7. The reinforcement tube 68 is an elongated, hollow tube having a substantially square cross-section, but the cross-section of the reinforcement tube 68 can be any shape sufficient to withstand the stresses applied thereto from the shifting load. The reinforcement tube 68 includes a cut-out portion 74 at the ends of opposing side surfaces, as illustrated in FIG. 8. The cut-out portions 74 allow the reinforcement tube 68 to be disposed in an abutting relationship with the opposing flanges 38 and the web 40 of the vertical brace 32. A reinforcement tube 68 is preferably welded to each outer vertical brace 32 such that the reinforcement tube 68 extends laterally outward from the vertical brace 32 to which it is attached.

Figure 9A:
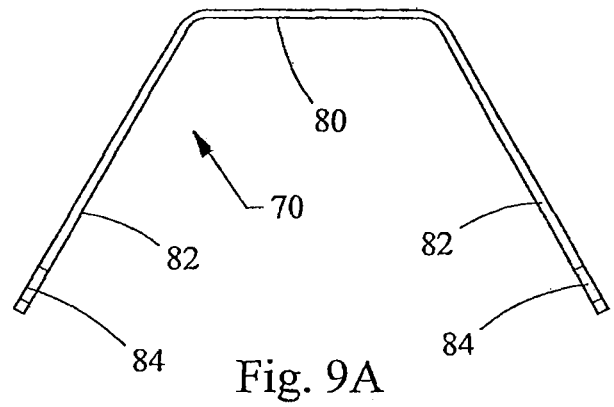
FIG. 9A is a side view of a reinforcement plate of the side connecting mechanism of FIG. 7.
Figure 9B:
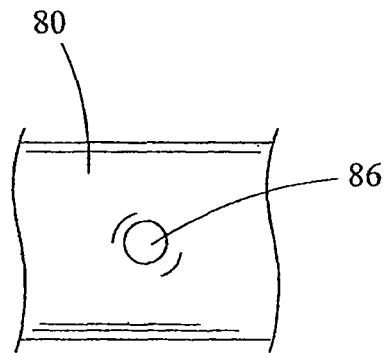
FIG. 9B is a top view of the top portion of the reinforcement plate of FIG. 9A.
Figure 9C:
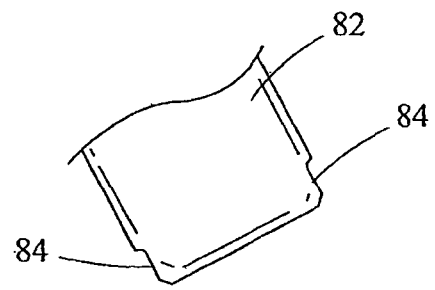
FIG. 9C is a leg of the reinforcement plate of FIG. 9A.
Figure 10A:
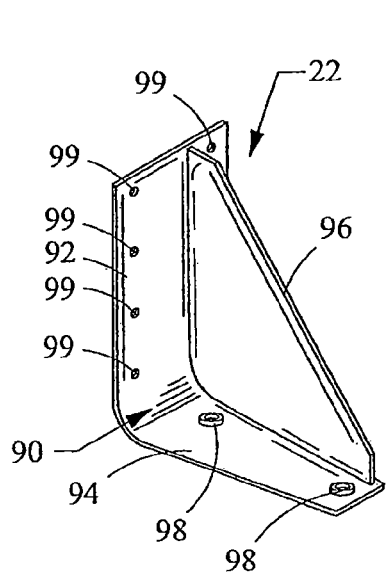
FIG. 10A is a perspective view of one embodiment of a reinforcement mechanism.
Figure 10B:
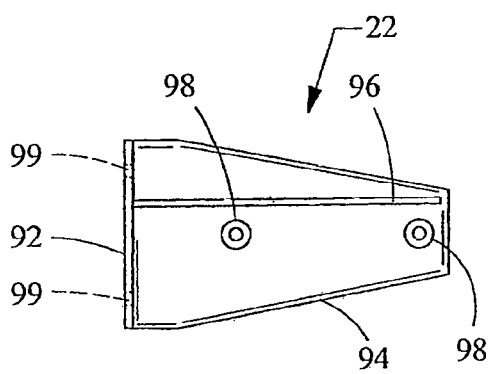
FIG. 10B is a top view of the reinforcement mechanism of FIG. 10A.
Figure 10C:
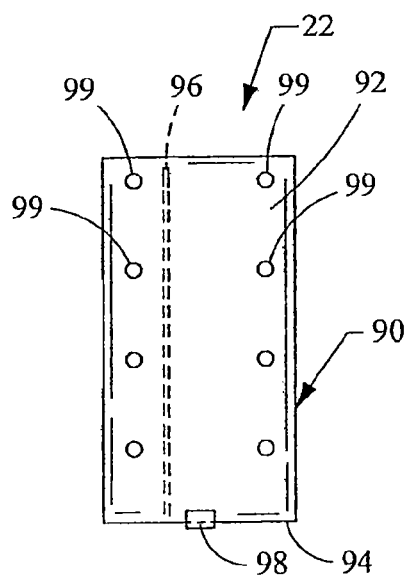
FIG. 10C is a rear view of the reinforcement mechanism of FIG. 10A.
Figure 10D:
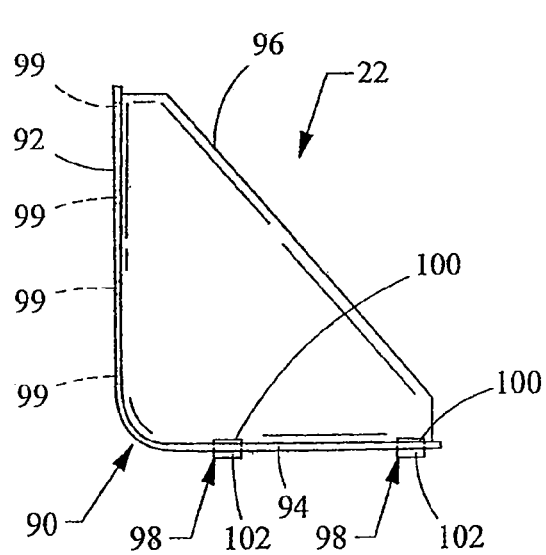
FIG. 10D is a side view of the reinforcement mechanism of FIG. 10A.

The reinforcement plate 70 of the side connecting mechanism 30 includes a top portion 80 and a pair of legs 82 extending in opposite directions at an angle from the top portion 80, as shown in FIGS. 9A-9C. In one embodiment, the reinforcement plate 70 can be formed as a single member, but the reinforcement plate 70 can also be formed such that the legs 82 are attached to the top portion 80 by way of a weld. The reinforcement plate 70 is disposed adjacent to the end of the reinforcement tube 68 such that the inwardly-directed surface of the top portion 80 of the reinforcement plate 70 is in an abutting relationship with the end of the reinforcement tube 68 opposite the cut-out portions 74 of the reinforcement tube 68, as shown in FIG. 7. The top portion 80 is preferably welded to the end of the reinforcement tube 68, and both of the legs 82 of the reinforcement plate 70 are directed toward the vertical brace 32 to which the reinforcement tube 68 is connected. Each opposing lateral edge of each leg 82 includes a cut-out portion 84 at the end opposite the end of the leg 82 adjacent to the top portion 80. The cut-out portion 84 of each leg 82 of the reinforcement plate 70 forms a surface that is adapted to be in an abutting relationship with the opposing flanges 38 and the web 40 of the vertical brace 32 to which the reinforcement tube 68 is attached, as shown in FIG. 7. The ends of the legs 82 having the cut-out portions 84 located abutting the vertical brace 32 can be welded to the vertical brace 32 in order to provide a secure connection between the reinforcement plate 70, reinforcement tube 68, and the vertical brace 32 to which the side connecting mechanism 30 is attached.

The top portion 80 of the reinforcement plate 70 includes an aperture 86 formed therethrough, as shown in FIG. 9B. The aperture 86 is adapted to receive the collar pin 72 that extends through the reinforcement tube 68 and the reinforcement plate 70, as illustrated in FIG. 7. In one embodiment, the collar pin 72 extends the entire width of the support structure 20 in addition to extending outward from both side connecting mechanisms 30, wherein the collar pin 72 is connected to each side connecting mechanism 30 as well as each vertical brace 32 through which the collar pin 72 passes. In another embodiment, each side connecting mechanism 30 includes a collar pin 72 having one distal end connected in a substantially rigid manner to the web 40 of the vertical brace 32 to which the side connecting mechanism 30 is attached, as shown in FIG. 7. The collar pin 72 extends from the web 40 of the vertical brace through, and laterally beyond, the hollow portion of the reinforcement tube 68 as well as through the aperture 86 formed in the top portion 80 of the reinforcement plate 70. The distal end of the collar pin 72 opposite the end connected to the web 40 of a vertical brace 32 includes a hole formed therethrough in a direction transverse to the longitudinal axis of the collar pin 72, whereby the collar pin 72 of the side connecting mechanism 30 can be operatively connected to the railcar 10 by way of a stabilizing mechanism 24.

As shown in FIG. 4, the lifting lugs 35 are attached to the support structure 20 in order to allow the support structure 20 to be easily lifted away from the railcar 10, lowered onto the railcar 10, or adjusted toward or away from the end of the railcar 10.

Turning to FIGS. 1-2 and 10A-10D, a reinforcement mechanism 22 is operatively connected to the support structure 20 and the railcar 10. The reinforcement mechanism 22 is adapted to be attached to the support structure 20 to reduce the amount of sway or movement of the support structure 20 in the fore-aft direction when the adjustable bulkhead 12 is attached to the railcar 10 and when the shifting load contacts the support structure 20. The reinforcement mechanism 22 is attached to the support structure 20 and is directed outwardly away from the load being carried on the railcar 10. At least one reinforcement mechanism 22 is disposed adjacent to the lower end of the support structure 20, and the reinforcement mechanism can be attached to the bottom cord 26, a vertical brace 32, a horizontal brace 34, any other structural member of the support structure 20, or any combination thereof. The reinforcement mechanism 22 can be integrally connected to the support structure 20 by a weld or the like, or the reinforcement mechanism 22 can be releasably attached to the support structure 20.

The reinforcement mechanism 22, as shown in FIGS. 10A-10D, is operatively attached to both the support structure 20 and the railcar 10, thereby securing the support structure 20 to the railcar 20. The reinforcement mechanism 22 allows the support mechanism 20 to be releasably attached to the railcar 10 such that the support structure 20 can easily be secured to the railcar 10 or disengaged from the railcar 10. The releasable attachment of the reinforcement mechanism 22 also allows for the adjustment of the support structure 20 along the length of the deck 16 of the railcar 10 in order to adjust the position of the support structure 20 relative to the ends of the railcar 10. The reinforcement mechanism 22 includes a base 90 having a first leg 92 and a second leg 94, a gusset 96, at least one lug 98 attached to the second leg 94, and at least one aperture 99 formed through the first leg 92. The base 90 can be formed as a single piece in which the first leg 92 is attached to the second leg 94 through a curved surface having a radius of curvature such that the first leg 92 is oriented at an angle relative to the second leg 94. The first leg 92 is preferably formed at a right angle relative to the second leg 94, but the first leg 92 can be oriented at any angle relative to the second leg 94 sufficient to provide reinforcement to the support structure 20 of the adjustable bulkhead 12 and to prevent the support structure 20 from swaying. The reinforcement mechanism 22 is attached to the support structure 20 such that the first leg 92 is aligned with the outer flange 38 of a vertical brace 32 in a substantially parallel manner and the second leg 94 is aligned with the top surface of the deck 16 of the railcar 10 in a substantially parallel manner. The base 90 can be made of sheet steel, but any other material sufficient to provide reinforcement to the support structure 20 can be used. In an alternative embodiment, the base 90 is formed by connecting the first and second legs 92, 94 by way of a weld, or any other attachment means sufficient to securely attach the legs to each other.

The reinforcement mechanism 22 further includes a gusset 96 attached to the first leg 92 and the second leg 94 of the base 90, as shown in FIGS. 10A-10D. The gusset 96 extends from both the first and second legs 92, 94 in a substantially normal manner, thereby forming a triangular load path to aide in transferring the applied load between the first leg 92 and the second leg 94 of the base 90. The gusset 96 can be formed as a substantially planar member having edges formed at an angle thereto. The edges of the gusset 96 formed at an angle are disposed adjacent to the first leg 92 and second leg 94 in an abutting manner. The gusset 96 can be welded to the base 90, or any other attachment mechanism sufficient to secure the gusset 96 to the base 90 can be used.

The first leg 92 of the base 90 of the reinforcement mechanism 22 includes a plurality of spaced-apart and aligned apertures 99 formed through the thickness of the first leg 92, as shown in FIGS. 10A-10D. The apertures 99 allow the first leg 92 of the base 90 to be connected to a vertical brace 32 of the support structure 20 by way of a bolt. In an alternative embodiment, the first leg 92 does not include apertures formed therethrough, and the first leg 92 is secured to the support structure by way of a weld. It should be understood by one skilled in the art that any other mechanism for attaching the reinforcement mechanism 22 to any member of the support structure 20 sufficient to assist in providing reinforcement to the support structure 20 can be used. The reinforcement mechanism 22 can be attached directly to a structural member of the support structure 20. Of course, the reinforcement mechanism 22 can also be operatively attached to the support structure such that the first leg 92 is attached to a spacer (not shown) or another member disposed between the reinforcement mechanism 22 and the support structure 20.

The second leg 94 of the base 90 of the reinforcement mechanism 22 has at least two lugs 98 attached thereto such that the lugs 98 are formed through the thickness of the second leg 94, as shown in FIGS. 10A-10D. The lugs 98 have a top portion 100 that is raised above the top surface of the second leg 94 and a bottom portion 102 that is raised below the bottom surface of the second leg 94. The bottom portion 102 of the lug 98 is receivable in an aperture 18 formed in the deck 16 of the railcar 10. In one embodiment, the lugs 98 are integrally formed with the second leg 94. In another embodiment, the lugs 98 can be attached to the second leg 94 by way of a weld or other attachment means sufficient to secure the lugs 98 to the second leg 94. The lugs 98 are spaced-apart such that the lugs 98 are received in pre-formed apertures 18 in the deck 16 of the railcar 10. In an alternative embodiment, the apertures 18 are formed in the deck 16 of the railcar in a spaced-apart manner to receive the lugs 98 of the reinforcement mechanism 22.

The reinforcement mechanism 22 operatively connects the bottom portion of the support structure 20 to the railcar 10, and the stabilizing mechanism 24 operatively connects the upper portion of the support structure 20 to the railcar 10, as shown in FIG. 1. A stabilizing mechanism 24 is operatively connected to a side connecting mechanism 30 of the support structure 20. The stabilizing mechanism 24 provides reinforcement to the support structure 20 in order to maintain the support structure 20 in a substantially upright orientation, prevent the support structure 20 from swaying in the fore-aft direction, and provides another load path between the support structure 20 to the railcar 10. The stabilizing mechanism 24 is operatively connected to the support structure 20 in which the stabilizing mechanism 24 can be releasably attached to the support structure 20. The attachment mechanism providing a connection between the stabilizing mechanism 24 and the support structure 20 can be any attachment means sufficient to allow the stabilizing mechanism 24 to be releasably connected to the support structure 20. The stabilizing mechanism 24 can also be rotatably connected to the support structure 20 such that the reinforcement to the upper portion of the support structure can be optimized.

Figure 12B:
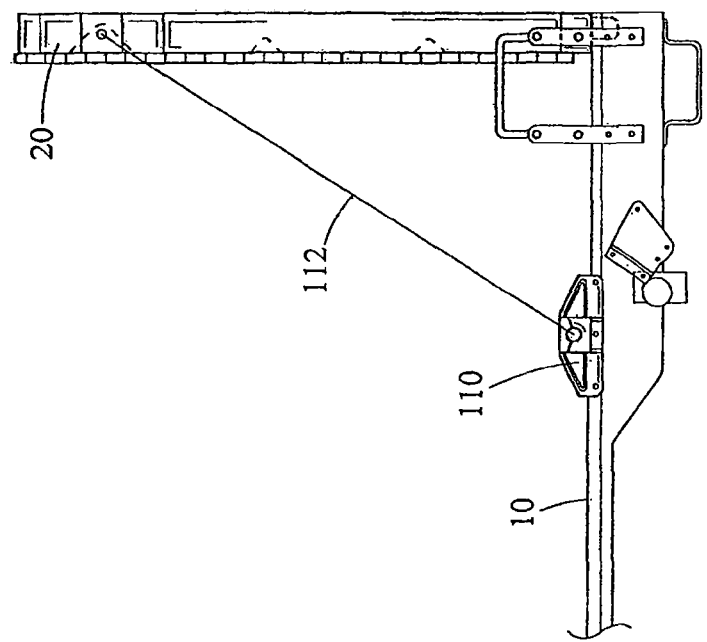
FIG. 12B is an adjustable bulkhead located in a second position on a railcar.
Figure 12A:
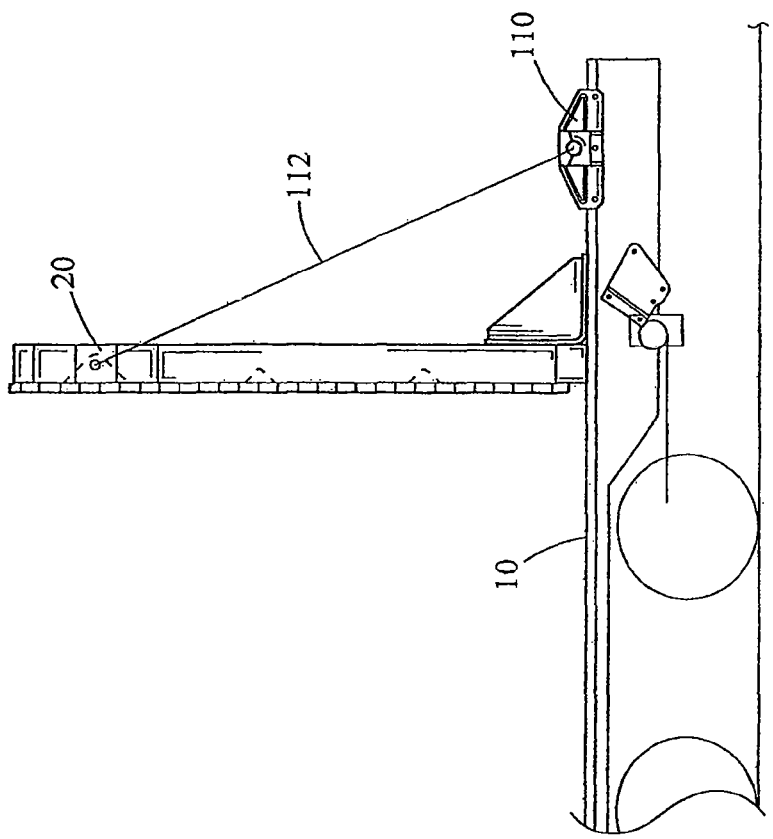
FIG. 12A is an adjustable bulkhead located in a first position on a railcar.

One embodiment of the stabilizing mechanism 24 includes a stabilizing bracket 110 and a side brace 112, as shown in FIG. 1. A stabilizing mechanism 24 is preferably connected to each side connecting mechanisms 30 of the support structure 20 and extends between the side connecting mechanism 30 and the railcar 10. FIG. 11 illustrate one embodiment of a stabilizing bracket 110 attached to the side sill 14 and the deck 16 of a railcar 10. The stabilizing bracket 110 is preferably connected to both the side sill 14 as well as the deck 16 of the railcar 10 for a more secure connection. The stabilizing bracket 110 is removably attachable to the railcar 10, wherein the stabilizing bracket 110 can be moved when the support structure 20 is relocated to another position along the deck 16 of the railcar 10, or the stabilizing bracket 110 can be removed when the support structure 20 is removed from the railcar 10. For example, as illustrated in FIG. 12B, the stabilizing bracket 110 can be disposed inward toward the middle of the railcar 10 relative to the support structure 20; the stabilizing bracket 110 can also be disposed outward toward the end of the deck 16 of the railcar 10 relative to the support structure 20, as illustrated in FIG. 12A. When the support structure 20 is disposed adjacent to the end of the deck 16 of the railcar, the stabilizing bracket 110 is preferably disposed inward toward the middle of the railcar 10 relative to the support structure 20, as shown in FIG. 12B. As the support structure 20 is adjusted, or moved, toward the middle of the railcar 10 and away from the end of the railcar, the stabilizing bracket 110 can be disposed either inward toward the middle of the railcar or outward toward the end of the railcar relative to the support structure 20.

Figure 13A:
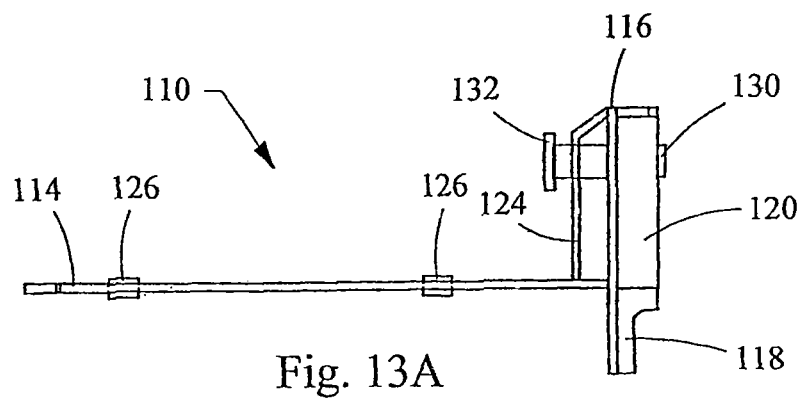
FIG. 13A is a side view of one embodiment of a stabilizing bracket.
Figure 13B:
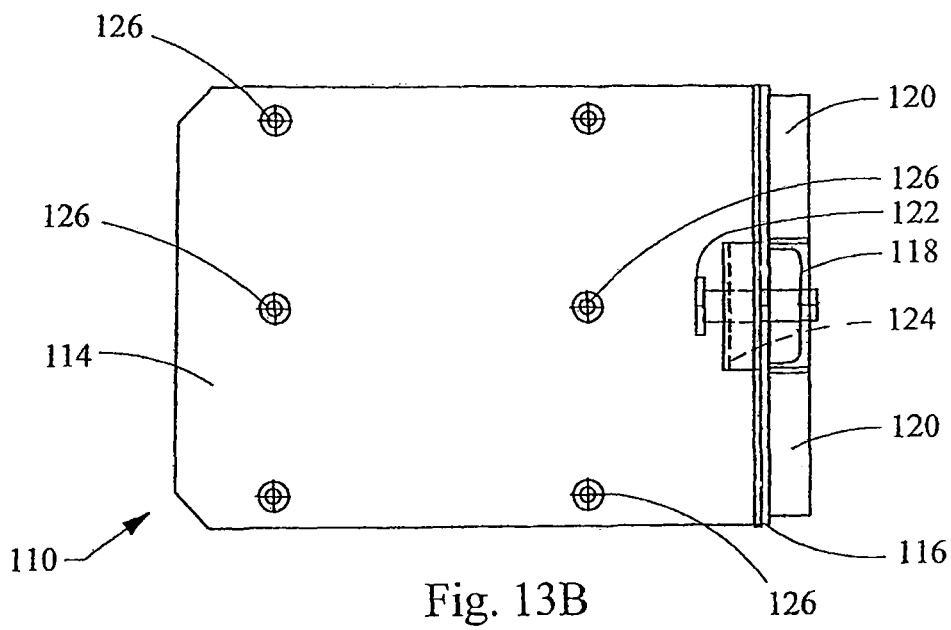
FIG. 13B is a top view of the stabilizing bracket of FIG. 13A.
Figure 13C:
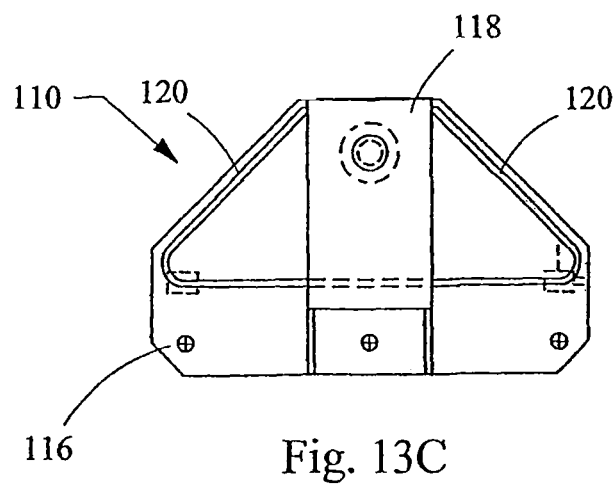
FIG. 13C is an end view of the stabilizing bracket of FIG. 13A.

One embodiment of a stabilizing bracket 110 is shown in FIGS. 13A-13C. The stabilizing bracket 110 includes a base plate 114, an end member 116, a channel 118, a pair of reinforcements 120, a pin assembly 122, a guide 124, and a receiving member 134. The base plate 114 is a substantially planar member that is adapted to be disposed adjacent to the top surface of the deck 16 of a railcar 10 in an abutting manner. The base plate 114 is elongate such that one edge of the base plate 114 is aligned with the outer lateral edge of the deck 16, as illustrated in FIG. 11, and the base plate 114 extends laterally inward therefrom. The length that the base plate 114 extends inward from the outer lateral edge of the deck 16 can vary, but the length should be sufficient to allow the stresses applied to the stabilizing bracket 110 to be distributed to through the base plate 114 to the deck 16 of the railcar 10. In one embodiment, a plurality of lugs 126 are located on the base plate 114 and extend through the thickness of the base plate 114. The lugs 126 are spaced-apart on the base plate 114 such that the lugs 126 align with the apertures 18 formed in the deck 16 of the railcar 10, and the lugs 126 are received within the apertures 18 in the deck 16 in order to aid in securing the stabilizing bracket 110 to the railcar as well as align the stabilizing bracket 110 relative to the support structure 20 of the adjustable bulkhead 12. The base plate 114 is removably attached to the deck 16 of the railcar 10. The base plate 114 can be connected to the deck 16 of the railcar 10 by way of a nut-and-bolt connecting mechanism, but any other connecting mechanism sufficient to secure the base plate 114 to the deck 16 in a substantially rigid manner can be used. In an alternative embodiment, the base plate 114 includes a plurality of apertures formed therethrough such that the apertures of the base plate are spaced apart in a manner in which the apertures of the base plate 114 are aligned with the apertures 18 formed in the deck 16 of the railcar 10.

The end member 116 of the stabilizing bracket 110 is attached to the base plate 114 in a substantially perpendicular, or normal manner relative to the base plate 114, as shown in FIGS. 13A-13C. The end member 116 extends above the top surface of the base plate 114 as well as below the bottom surface of the base plate 114. The end member 116 can be attached to the base plate 114 by way of a weld, but any other attachment means can be used. When the stabilizing bracket 110 is disposed on the railcar 10 to be attached thereto, the portion of the end member 116 that extends below the bottom surface of the base plate 114 is aligned with the outwardly-directed surface of the side sill 14 in a substantially parallel, abutting manner. A plurality of apertures 128 are formed through the end member 116. The apertures 128 are spaced-apart in a substantially parallel manner relative to the deck 16 of the railcar 10. When the stabilizing bracket 110 is disposed on the railcar 10 such that the lugs 126 of the base plate 114 are aligned with the apertures 18 formed through the deck 16, the apertures 128 formed through the end member 116 are aligned with the apertures 19 formed through the side sill 14 of the railcar 10. The end member 116 can be removably attached to the side sill 14 of the railcar 10 by way of a nut-and-bolt connecting mechanism, but any other connecting mechanism sufficient to secure the end member 116 to the side sill 14 can be used.

A U-shaped channel 118 is attached to the outwardly-directed surface of the end member 116 at a central location, as shown in FIGS. 13A-13C. The channel 118 is disposed adjacent to the end member 116 such that the longitudinal length of the channel 118 is oriented in a substantially vertical manner relative to the end member 116. The opposing flanges of the U-shaped channel 118 are in an abutting relationship with the end member 116, and the web extending between the opposing flanges of the channel 118 is spaced outward from the end member 116. The channel 118 can be welded to the end member 116, but any other attachment means can be used. The channel 118 is elongated in the vertical direction such that the channel 118 extends toward both the upper edge of the end member 116 as well as the lower edge of the end member 116. The channel 118 includes an aperture (not shown) adapted to receive the pin assembly 122.

A pair of angled reinforcements 120 are attached to the end member and the channel 118, as shown in FIGS. 13A-13C. Each reinforcement 120 has a pair of legs formed at an angle relative to each other. The distal end of each of the legs of the reinforcement 120 are attached to a flange of the channel 118, and a lateral edge of the reinforcement 120 is in an abutting relationship with the outwardly-directed surface of the end member 116. The reinforcements 120 are attached to both opposing flanges of the channel 118 as well as the end member 116. The reinforcements 120 can be welded to the channel 118 as well as the end member 116.

The guide 124 is attached to the outwardly-directed surface of the end member 116 adjacent to the top surface of the base plate 114, as shown in FIGS. 13A-13C. The guide 124 can be attached to the end member 116 and the base plate 114 by a weld. The guide 124 is adapted to ensure that the pin assembly 122 receives the side brace 112 of the stabilizing mechanism 24.

The pin assembly 122 includes a horizontally-oriented pin 130 and a head 132, as illustrated in FIGS. 13A-13C. The head 132 is attached to a distal end of the pin 130. The pin assembly 122 extends through the end member 116, channel 118, and a portion of the guide 124 such that the head 132 attached to the pin 130 is disposed laterally outward from, and directed away from, the centerline of the railcar 10. The distal end of the pin 130 opposite the end of the pin 130 to which the head 132 is attached extends through, and located adjacent to, the end member 116. The pin 130 extends away the centerline of the railcar 10 such that the head 132 is located laterally outward from the lateral edge of the deck 16 of the railcar 10.

The stabilizing bracket 110 further includes a receiving member 134 attached to the top surface of the base plate 114 and the inwardly-directed surface of the end member 114, as shown in FIGS. 13A-13C. The receiving member 134 includes a pair of spaced-apart side walls 136 that are aligned in a substantially parallel relationship relative to the opposing side wall 136 and a bottom member 138 extending between, and connecting, the opposing side walls 136. The side walls 136 are aligned in a vertical manner and extend upwardly from the bottom member 138 which is in an abutting relationship with the top surface of the base plate 114. The side walls 136 and the bottom member 138 extend inwardly from an abutting relationship with the inward-directed surface of the end member 116. The receiving member 134 can extend a distance inward from the end member 116 substantially similar to that which the base plate 114 extends inward from the end member 116, but it should be understood that the receiving member 134 can extend inward from the end member 116 any distance less than the distance which the base plate 114 extends inward from the end member 116.

The side walls 136 of the receiving member 134 are spaced-apart a distance sufficient to receive a wood block (not shown). The receiving member 134 is centrally located atop the base plate 114 relative to the opposing edges of the base plate 114 that are oriented in a substantially perpendicular manner relative to the end member 116. The longitudinal centerline of the receiving member 134 is also substantially aligned with the longitudinal centerline of the channel 118 in a parallel manner. When two stabilizing brackets 110 are attached to opposing edges of the deck 16 of a railcar 10, the receiving members 134 of the stabilizing brackets 110 are aligned such that a wood block extends between the stabilizing brackets 110 above the deck 16 of the railcar 10. The wood block provides a spacer between the load being transported via the railcar 10, and when the load is disposed atop the wood block the weight of the load assists in maintaining a secure connection between each stabilizing bracket 110 and the deck 16. The side walls 136 and the bottom member 138 can be attached to the base plate 114 and the end member 116 by a weld, but any other attachment means sufficient to secure the side walls 136 and the bottom member 138 to the base plate 114 and the end member 116 can be used.

Figure 14A:
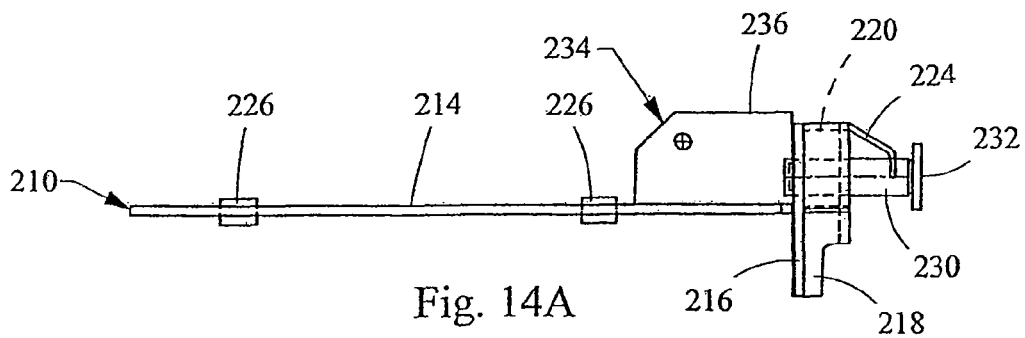
FIG. 14A is a side view of another embodiment of a stabilizing bracket.
Figure 14B:
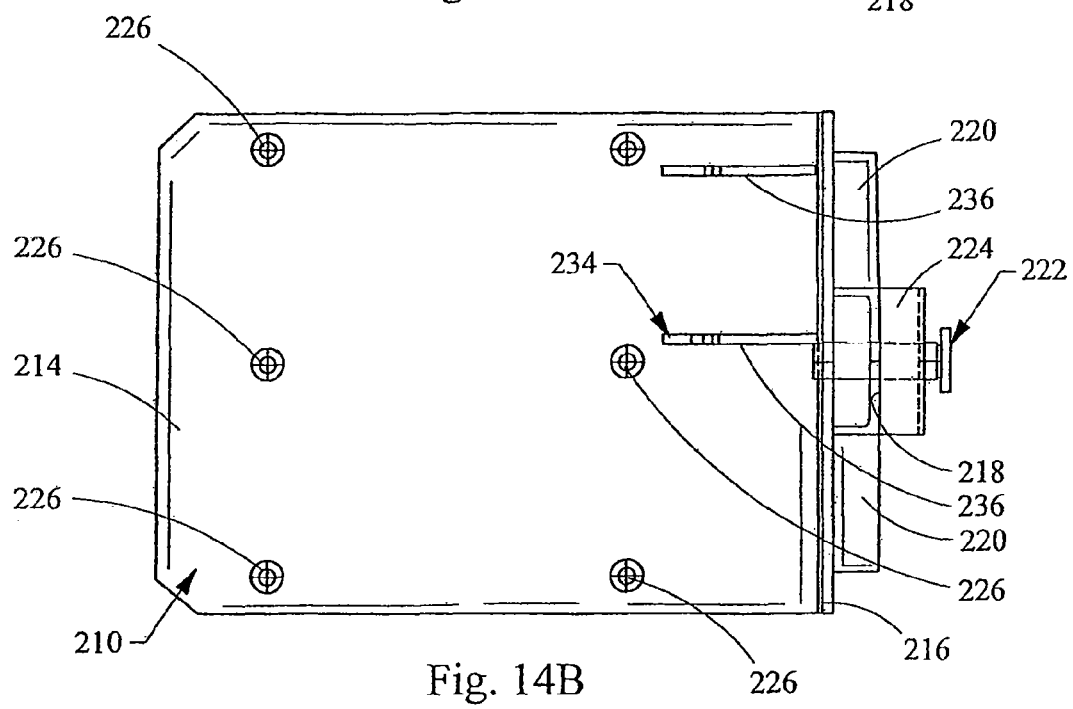
FIG. 14B is a top view of the stabilizing bracket of FIG. 14A.
Figure 14C:
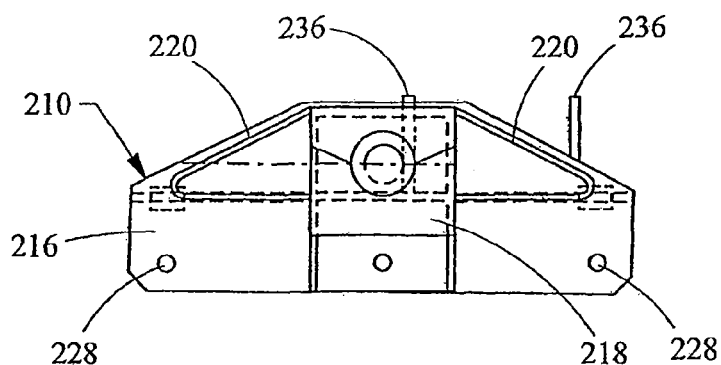
FIG. 14C is an end view of the stabilizing bracket of FIG. 14A.

An alternative embodiment of a stabilizing bracket 210 is shown in FIGS. 14A-14C. The stabilizing bracket 210 includes a base plate 214, an end member 216, a channel 218, a pair of reinforcements 220, a pin assembly 222, a guide 224, and a receiving member 234. The base plate 214 is a substantially planar member that is adapted to be disposed adjacent to the top surface of the deck 16 of a railcar 10 in an abutting manner. The base plate 214 is elongate such that one edge of the base plate 214 is aligned with the outer lateral edge of the deck 16 and the base plate 214 extends laterally inward therefrom. The length that the base plate 214 extends inward from the outer lateral edge of the deck 16 can vary, but the length should be sufficient to allow the stresses applied to the stabilizing bracket 210 to be distributed to through the base plate 214 to the deck 16 of the railcar 10. In one embodiment, a plurality of lugs 226 are located on the base plate 214 and extend through the thickness of the base plate 214. The lugs 226 are spaced-apart on the base plate 214 such that the lugs 226 align with the apertures 18 formed in the deck 16 of the railcar 10, and the lugs 226 are received within the apertures 18 in the deck 16 in order to aid in securing the stabilizing bracket 210 to the railcar as well as align the stabilizing bracket 210 relative to the support structure 20 of the adjustable bulkhead 12. The base plate 214 is removably attached to the deck 16 of the railcar 10. The base plate 214 can be connected to the deck 16 of the railcar 10 by way of a nut-and-bolt connecting mechanism, but any other connecting mechanism sufficient to secure the base plate 214 to the deck 16 in a substantially rigid manner can be used. In an alternative embodiment, the base plate 214 includes a plurality of apertures formed therethrough such that the apertures of the base plate are spaced apart in a manner in which the apertures of the base plate 214 are aligned with the apertures 18 formed in the deck 16 of the railcar 10

The end member 216 of the stabilizing bracket 210 is attached to the base plate 214 in a substantially perpendicular, or normal manner relative to the base plate 214, as shown in FIGS. 14A-14C. The end member 216 extends above the top surface of the base plate 214 as well as below the bottom surface of the base plate 214. The end member 216 can be attached to the base plate 214 by way of a weld, but any other attachment means can be used. When the stabilizing bracket 210 is disposed on the railcar 10 to be attached thereto, the portion of the end member 216 that extends below the bottom surface of the base plate 214 is aligned with the outwardly-directed surface of the side sill 14 in a substantially parallel, abutting manner. A plurality of apertures 228 are formed through the end member 216. The apertures 228 are spaced-apart in a substantially parallel manner relative to the deck 16 of the railcar 10. When the stabilizing bracket 210 is disposed on the railcar 10 such that the lugs 226 formed through the base plate 214 are aligned with the apertures 18 formed through the deck 16, the apertures 228 formed through the end member 216 are aligned with the apertures 19 formed through the side sill 14 of the railcar 10. The end member 216 can be removably attached to the side sill 14 of the railcar 10 by way of a nut-and-bolt connecting mechanism, but any other connecting mechanism sufficient to secure the end member 216 to the side sill 14 can be used.

A U-shaped channel 218 is attached to the outwardly-directed surface of the end member 216, as shown in FIGS. 14A-14C. The channel 218 is disposed adjacent to the end member 216 such that the longitudinal length of the channel 218 is oriented in a substantially vertical manner. The opposing flanges of the U-shaped channel 218 are in an abutting relationship with the end member 216, and the web extending between the opposing flanges of the channel 218 is spaced laterally outward from the end member 216. The channel 218 can be welded to the end member 216, but any other attachment means can be used. The channel 218 is elongated in the vertical direction such that the channel 218 extends toward both the upper edge of the end member 216 as well as the lower edge of the end member 216. The channel 218 includes an aperture (not shown) adapted to receive the pin assembly 222.

A pair of angled reinforcements 220 are attached to the end member and the channel 218, as shown in FIGS. 14A-14C. Each reinforcement 220 has a pair of legs formed at an angle relative to each other. The distal end of the legs of the reinforcement 220 are attached to a flange of the channel 218, and a lateral edge of the reinforcement 220 is in an abutting relationship with the outwardly-directed surface of the end member 216. The reinforcements 220 are attached to both opposing flanges of the channel 218 as well as the end member 216. The reinforcements 220 can be welded to the channel 218 as well as the end member 216.

The guide 224 is attached to the outwardly-directed surface of the channel 218 adjacent to the top surface of the channel 218, as shown in FIGS. 14A-14C. The guide 224 can be attached to the channel 219 by a weld, but any other attachment means can be used. The guide 224 is adapted to ensure that the pin assembly 222 receives the side brace 112 of the stabilizing mechanism 24. The guide 224 extends in a direction outward and downward from the upper portion of the channel 219 in a downwardly-angled manner. The guide 224 is attached to the top surface of the pin assembly 222.

The pin assembly 222 includes a horizontally-oriented pin 230 and a head 232, as illustrated in FIGS. 14A-14C. The head 232 is attached to a distal end of the pin 230. The pin assembly 222 extends through the end member 216, the channel 218, and is in an abutting relationship with the guide 224 such that the head 232 attached to the pin 230 is disposed laterally outward away from the centerline of the railcar 10, and the distal end of the pin 230 opposite the end of the pin 230 to which the head 232 is attached is located adjacent to the end member 216. The pin 230 and head 232 extend outwardly beyond the lateral edge of the deck 16 of the railcar 10 to which the stabilizing bracket 210 is attached.

The stabilizing bracket 210 further includes a receiving member 234 attached to the top surface of the base plate 214 and the inwardly-directed surface of the end member 216, as shown in FIGS. 14A-14C. The receiving member 234 includes a pair of spaced-apart side walls 236 that are aligned in a substantially parallel relationship relative to the opposing side wall 236. The side walls 236 are aligned in a vertical manner and extend upwardly from an abutting relationship with the top surface of the base plate 214. The side walls 236 also extend inwardly from an abutting relationship with the inward-directed surface of the end member 216.

The side walls 236 are spaced-apart a distance sufficient to receive a wood block (not shown). The side walls 236 are disposed at a position offset from a central position relative to the base plate 214 and the channel 218. In one embodiment, the side walls 236 are located at a position adjacent to a side edge of the base plate 214 that is oriented in a substantially perpendicular manner relative to the end member 216. In another embodiment, the side walls 236 are located at a position adjacent to the opposing side edge of the base plate 214 that is oriented in a substantially perpendicular manner relative to the end member 216. When two stabilizing brackets 210 are attached to opposing edges of the deck 16 of a railcar 10, the two embodiments of the stabilizing bracket 210 are used such that the receiving members 234 of the opposing stabilizing brackets 210 are aligned and a wood block extends between the opposing stabilizing brackets 210 above the deck 16 of the railcar 10. The wood block provides a spacer between the load being transported via the railcar 10, and when the load is disposed atop the wood block the weight of the load assists in maintaining a secure connection between each stabilizing bracket 210 and the deck 16. The side walls 236 can be attached to the base plate 214 and the end member 216 by a weld, but any other attachment means sufficient to secure the side walls 236 to the base plate 214 and the end member 216 can be used.

The stabilizing bracket 110, 210 is operatively connected to the support structure 20 by way of a side brace 112, as shown in FIG. 1. The side brace 112 is an elongated member that extends between the side connecting mechanism 30 of the support structure to the stabilizing bracket 110, 210 in order to stabilize the upper portion of the support structure 20. As shown in FIGS. 15A-15B, one embodiment of a side brace 112 is formed of an elongated tube 140, an upper bracket 142 attached to one end of the tube 140, and a lower bracket 144 attached to the opposing end of the tube 140. The tube 140 can be hollow and can have a circular cross-section, but the tube 140 can be formed having any shaped cross-section or be a solid member. Alternatively, in the embodiment illustrated in FIGS. 16A-16B, the tube 140 is replaced with a C-shaped structural channel 240. This embodiment is also shown in FIG. 7. FIGS. 16A-16B illustrate an alternative embodiment of the side brace 212. The reference numbers in FIGS. 16A-16B correspond to the reference numbers in FIGS. 15A-15B, utilizing a leading "2" instead of a leading "1". Because the side brace 112 can be used to secure support structures 20 having different heights, the length of the tube 140 may vary depending upon the height of the support structure 20 and the distance between the side connecting mechanism 30 of the support structure 20 and the stabilizing bracket 110, 210 to which the side brace 112 is attached. The tube 140 includes opposing slot 146 that extends from the distal end through the thickness of the opposing walls of the tube 140 at approximately one-hundred eighty (180) degrees relative to each other. The tube 140 further includes slots 148 formed through the thickness of the tube 140 and a slot 148 is spaced longitudinally inward from each distal end of the tube 140. The slots 148 are aligned substantially ninety (90) degrees about the circumference relative to the slots 146. The slots 146 are adapted to receive the upper and lower brackets 142, 144 at each opposing end of the tube 140, and the slots 148 are adapted to receive a spacer 150 to form a secure connection between the upper and lower brackets 142, 144 and the tube 140.

The upper bracket 142 is an elongated bracket having an aperture 149 formed through the upper bracket 142, as shown in FIGS. 15A-15B. The aperture 149 is adapted to receive the collar pin 72 of the side connecting mechanism 30, thereby operatively connecting the upper bracket 142 to the support structure 20. A portion of the upper bracket 142 is inserted into the opposing slots 146 in the tube 140. The upper bracket 142 is aligned through the tube 140 in a bisecting manner. A spacer 150 is inserted between a surface of the upper bracket 142 and is received in the slot 148 such that the spacer 150 abuts the upper bracket 142. The upper bracket 142 can be welded to the tube 140, and the spacer 150 can be welded to both the upper bracket 142 as well as the tube 140, thereby forming a substantially rigid connection between the upper bracket 142 and the tube 140.

The lower bracket 144 is an elongated bracket having a keyhole aperture 152 formed through the lower bracket 144, as shown in FIGS. 15A-15B. The keyhole aperture 152 is adapted to receive the pin 230 of the pin assembly 222, thereby operatively connecting the lower bracket 144 to the stabilizing bracket 210. A portion of the lower bracket 144 is inserted into the opposing slots 146 in the tube 140. The lower bracket 144 is aligned through the tube 140 in a bisecting manner. A spacer 150 is inserted between a surface of the lower bracket 144 and is received in the slot 148 such that the spacer 150 abuts the lower bracket 144. The lower bracket 144 can be welded to the tube 140, and the spacer 150 can be welded to both the lower bracket 144 as well as the tube 140, thereby forming a substantially rigid connection between the lower bracket 144 and the tube 140.

When installing or removing the adjustable bulkhead 12 from the railcar 10, the lifting lugs 35 can be used as contact points to which a lifting mechanism can be attached. To install the adjustable bulkhead 12 on a railcar 10, the support structure 20 is disposed adjacent to the deck 16 of the railcar 10 in a transverse orientation such that the support structure 20 extends across at least a portion of the width of the railcar 10. The support structure 20 is placed on the deck 16 such that the bottom chord 26 is in an abutting relationship with the deck 16 of the railcar 10 and the support structure 20 is oriented in a substantially vertical manner. The adjustable bulkhead 12 is preferably used in conjunction with a railcar 10 having a plurality of aligned apertures 18 formed through the deck 16 as well as a plurality of aligned apertures 19 formed through the side sill, wherein the apertures 18, 19 are adapted to receive the adjustable bulkhead 12. Because the apertures 18, 19 in the railcar 10 are spaced apart in a pattern along the length of the railcar 10, the adjustable bulkhead 12 can be disposed at a plurality of locations along the length of the deck 16. Examples of positions to which the adjustable bulkhead 12 can be attached to the railcar 10 are shown in FIGS. 12A-12B, but it should be understood by one skilled in the art that the positions illustrated are exemplary and are not limited thereto. The adjustable bulkhead 12 is releasably attachable to the railcar 10 such that the position at which the adjustable bulkhead 12 is connected to the railcar 10 can be easily adjusted.

When the support structure 20 of the adjustable bulkhead 12 is disposed at the desired position, at least one reinforcement mechanism 22 is attached to the support structure 20 and the deck 16, thereby providing an operative connection between the support structure and the railcar 10. In one method of attachment, the reinforcement mechanism 22 is attached to the support structure 20 prior to the support structure 20 being disposed on the deck 16. In an alternative method of attachment, the reinforcement mechanism 22 is attached to the support structure 20 after the support structure 20 is disposed on the deck 16. The reinforcement mechanism 22 is preferably attached to the surface of the support structure 20 opposite the side adjacent to the load being carried on the railcar 10. However, if the support structure 20 is attached immediately adjacent to the end of the deck 16, the reinforcement mechanism 22 may not operatively connect the bottom portion of the support structure 20 to the deck 16. In this instance, any other attachment mechanism sufficient to secure the bottom portion of the support structure to the railcar 10 and assist in preventing sway of the support structure 20 in the fore-aft direction can be used.

After the support structure 20 is operatively connected to the deck 16 of the railcar 10, a stabilizing mechanism 24 is attached to the railcar 10 and the side connecting mechanism 30 of the support structure 20, thereby operatively connecting the upper portion of the support structure 20 to the railcar 10. A stabilizing bracket 110, 210 is attached to each side of the railcar 10 adjacent to the opposing side sills 14, wherein the base plate 114, 214 is disposed immediately adjacent the deck 16 of the railcar 10 and the end member 116, 216 is disposed immediately adjacent a side sill 14 of the railcar. The lugs 126, 226 of the base plate 114, 214 are disposed in corresponding apertures 18 formed through the deck 16 and the apertures 128, 228 formed through the end member 116, 216 of the stabilizing bracket 110, 210 are aligned with corresponding apertures 19 formed through the side sill 14 of the railcar. The stabilizing bracket 110, 210 is then secured to the railcar 10 in a substantially rigid manner. Depending upon the location at which the support structure 20 is disposed along the deck 16 of the railcar 10, the stabilizing bracket 110, 210 can be attached to the railcar 10 on either side of the support structure 20, as shown in FIGS. 12A-12B.

When the stabilizing bracket 110, 210 is disposed a distance from the end of the deck 16 greater than the distance between the support structure 20 and the same end of the deck 16, a side brace 112 operatively connects the side connecting mechanism 30 to the corresponding stabilizing bracket 110, 210. If the load being transported by the railcar 10 moves during transport such that the load contacts the support structure 20, the top portion of the support structure will be biased toward the adjacent end of the railcar 10. The resultant stresses applied to the adjustable bulkhead 12 as a result of the sliding load results in the side brace 112 being in tension as the load path extends from the support structure 20 through the opposing side connecting mechanisms 30 through the side braces 112 attached to the corresponding side connecting mechanism to the corresponding stabilizing bracket 110, 210 attached to the railcar 10.

When the stabilizing bracket 110, 210 is disposed a distance from the end of the deck 16 less than the distance between the support structure 20 and the same end of the deck 16, a side brace 112 operatively connects the side connecting mechanism 30 to the corresponding stabilizing bracket 110, 210. If the load being transported by the railcar 10 moves during transport such that the load contacts the support structure 20, the top portion of the support structure 20 will be biased toward the adjacent end of the railcar 10. The resultant stresses applied to the adjustable bulkhead 12 as a result of the sliding load results in the side brace 112 being in compression as the load path extends from the support structure 20 through the opposing side connecting mechanisms 30 through the side braces 112 attached to the corresponding side connecting mechanism 30 to the corresponding stabilizing bracket 110, 210 attached to the railcar 10. Because the side brace 112 is in tension, the tube 140 of the side brace 112 preferably has a circular cross-section. The circular cross-section of the tube 140 tends to withstand compression stresses better than tubes having other cross-sections.

Once the stabilizing bracket 110, 210 has been secured to the railcar 10, the upper bracket 142 of a side brace 112 is attached to each side connecting mechanism 30 of the support structure 20. The collar pin 72 extending from the side connecting mechanism 30 is inserted through the aperture 149 formed through the upper bracket 142 of the side brace 112. A pin (not shown) is inserted through a hole (not shown) formed through the diameter of the collar pin 72 at a location laterally outward from the upper bracket 142 so that the upper bracket 142 does not slip off the collar pin 72. The upper bracket 142 is rotatably attached to the side connecting mechanism 30 such that the side brace 112 is rotatable about the longitudinal axis of the collar pin 72.

After the upper bracket 142 of the side brace 112 is operatively connected to the side connecting mechanism 30, the lower bracket 144 is operatively connected to the corresponding stabilizing bracket 110, 210. The head 132 attached to the pin 130 of the pin assembly 122 is inserted through the keyhole aperture 152 formed through the lower bracket 144 of the side brace 112. The lower bracket 144 of the side brace 112 is removably attached to the stabilizing bracket 110, 210 such that the upper portion of the support structure 20 is connected to the railcar 10.

The adjustable bulkhead 12 is adjustable along the length of the deck 16 of the railcar 10 in order to minimize the distance between the support structure 20 and the load being transported. When the distance between the support structure 20 and the load is minimized, less force is applied to the adjustable bulkhead 12 as a result of the load shifting during transport. The adjustable bulkhead 12 is adjustable along the length of the railcar 10 by removing the adjust bulkhead 12 and disposing the support structure 20 at a location either fore or aft of the previous location at which the support structure 20 was connected to the railcar 10. Upon disposing the support structure 20 at a desired position on the railcar 10, the remaining members of the adjustable bulkhead 12 are attached to the railcar 10 to provide a secure connection between the adjustable bulkhead 12 and the railcar 10.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. An adjustable bulkhead for a railcar, said railcar including a deck and a side sill, said adjustable bulkhead comprising a support structure operatively attachable to said railcar, wherein said support structure is removably attachable at a plurality of positions along said deck of said railcar, at least one of said plurality of positions being spaced away from an end sill of said railcar and towards a lateral center of said railcar;
   at least one stabilizing bracket attached to said deck, wherein an attachment point of said at least one stabilizing bracket is closer to said end sill of said railcar than it is to said support structure; and
   at least one side brace attached to said stabilizing bracket, said side brace being rotatably attached to said support structure and being positioned laterally outside of said side sill of said railcar.

2. The adjustable bulkhead of claim 1 further comprising at least one reinforcement mechanism operatively connecting said support structure to said railcar.

3. The adjustable bulkhead of claim 2, wherein said at least one reinforcement mechanism is rigidly attached to said support structure.

4. The adjustable bulkhead of claim 2, wherein said at least one reinforcement mechanism is releasably attachable to said support structure.

5. The adjustable bulkhead of claim 4, wherein said support structure includes a plurality of vertical braces and each reinforcement mechanism is attached to one of said vertical braces.

6. An adjustable bulkhead for a railcar, said railcar including a deck and a side sill, said adjustable bulkhead comprising a support structure operatively attachable to said railcar, wherein said support structure is removably attachable at a plurality of positions along said deck of said railcar;
   a stabilizing mechanism and a side brace operatively connecting said support structure to said railcar, said stabilizing mechanism including a stabilizing bracket, said stabilizing bracket including a base plate, an end member, and a pin assembly;
   wherein a plurality of apertures formed through said end member are alignable with corresponding apertures formed through said side sill of said railcar.

7. An adjustable bulkhead for a railcar, said railcar including a deck and a side sill, said adjustable bulkhead comprising a support structure operatively attachable to said railcar, wherein said support structure is removably attachable at a plurality of positions along said deck of said railcar, at least one of said plurality of positions being spaced away from an end sill of said railcar and towards a lateral center of said railcar;
   at least one stabilizing bracket attached to said deck, wherein an attachment point of said at least one stabilizing bracket is closer to said end sill of said railcar than it is to said support structure; and
   at least one side brace attached to said stabilizing bracket, said side brace being rotatably attached to said support structure.

8. An adjustable bulkhead for a railcar, said railcar including a deck and a side sill, said adjustable bulkhead comprising a support structure operatively attachable to said railcar, wherein said support structure is removably attachable at a plurality of positions along said deck of said railcar;
   at least one stabilizing bracket attached to said deck, said stabilizing bracket including a base plate, an end member, and a pin assembly;
   at least one side brace attached to said stabilizing bracket, said side brace being rotatably attached to said support structure and being positioned laterally outside of said side sill of said railcar; and
   a plurality of lugs formed through said base plate are receivable in apertures formed through said deck of said railcar.

* * * * *